United States Patent [19]

Rabjohns

[11] Patent Number: 5,592,881
[45] Date of Patent: Jan. 14, 1997

[54] SYSTEM FOR IDENTIFYING MODULES IN A MODULAR PRINTING APPARATUS

[75] Inventor: Douglas T. Rabjohns, Fairport, N.Y.

[73] Assignee: Xerox Corporation, Stamford, Conn.

[21] Appl. No.: 520,222

[22] Filed: Aug. 28, 1995

[51] Int. Cl.⁶ .................................................. B41F 1/28
[52] U.S. Cl. .................. 101/483; 270/58.07; 270/58.01; 341/8
[58] Field of Search ........................... 101/483, 248; 341/8; 439/75, 45, 46; 270/58; 380/25, 55

[56] References Cited

U.S. PATENT DOCUMENTS

| | | | |
|---|---|---|---|
| 4,082,039 | 4/1978 | Schutt et al. | 101/483 |
| 4,820,171 | 4/1989 | Korteqaard | 439/75 |
| 5,096,178 | 3/1992 | Yamada et al. | 271/9 |
| 5,191,540 | 3/1993 | Ramsey | 270/58 |
| 5,365,587 | 11/1994 | Campbell et al. | 380/28 |

*Primary Examiner*—Eugene H. Eickholt
*Attorney, Agent, or Firm*—R. Hutter

[57] ABSTRACT

A system for controlling a plurality of function-specific modules in a high-volume electronic printing apparatus involves assigning a unique connection code to each physical connection between a pair of modules in the system. In order for a central control system to identify specific modules when the system is operating, each module is assigned a unique identification code which is a concatenation of the connection codes for the connections to other modules. Each module in a large system is thus identified by a unique code determined by its neighboring modules.

8 Claims, 4 Drawing Sheets

SYSTEM FOR IDENTIFYING MODULES IN A MODULAR PRINTING APPARATUS

The present invention relates to print-on-demand electronic printers and copiers, and in particular to the construction of high-speed, high-volume printers and copiers having a modular architecture.

At the high end of the electronic printing market, it is common that a particular high-speed, high-volume printing or copying machine will be custom-designed for a particular customer. While any printer or copier will have at least one "marking engine," that is an apparatus which places marks on paper, other equipment essential to the customer's purpose may vary widely. For example, a customer may desire several paper feeders, each feeder capable of feeding a particular size or type of paper; or, post-marking equipment, such as staplers, stackers, sorters, and binders, may be desired in different configurations by different customers.

In order to serve the needs of various customers most efficiently, it is desirable that a "modular" architecture for a printing or copying machine be employed. Typically, around a basic marking engine module, a particular customer may purchase only the special equipment desired. Some customers, for example, may require a stacker and a stapler, but have no need for a binder, while another customer may require three separate feeders for feeding three separate types of paper, such as letter size, legal size, and cover stock. With a modular architecture, it is ideal that a customer could simply plug in the extra modules as needed, and then have the system as a whole automatically adapt to the new architecture to use the marking engine with whatever equipment is physically connected to it.

An ideal modular architecture for a printing apparatus (or any system, for that matter) would have a control system which could immediately recognize changes in the architecture and instantaneously adapt to the new arrangement, such as when the user rolls up and plugs in, for example, a stapler module. A desirable system would recognize the presence of the new stapler module by the mere fact it had been physically plugged to the rest of the system, and then know under what circumstances to operate the stapler. Great practical difficulties arise, however, in devising a control system which can not only recognize the capabilities of any new equipment plugged into the system, but further which can retain a "topography" of the whole system, recognizing the location and function of each module in the system at a given time. In order to obtain this "topography," a control system must be made aware of the specific location of every module currently plugged in to the system, relative to all other modules in the system.

In known prior-art systems for controlling a large number of modules in a coordinated system such as for printing, it is typical to provide each individual module with a "name" or identification code so that the central control system can address a particular module as needed, in order to carry out a system-wide process. The addressing of individual modules by a central control can be performed either through direct one-to-one wiring between the control system and each individual module, or through an address bus. However, there are certain complications involved with this basic system. Typically there must be a routine, every time the system is turned on or reconfigured, in which the control system polls every available module to which it is connected and then derives a topography of the whole system. It is also common to have every module have a dedicated identification code, by which it is addressed when operated by the control system. This arrangement can be difficult if two physically identical modules are provided in the same system, as would be provided with two feeder modules each outputting a different type of paper. Derivation of this topography can therefore consume a substantial amount of resources in the controller both when the poll is being conducted, and during the use of the control system in a printing process.

According to one aspect of the present invention, there is provided, in a printing system wherein sheets are caused to move among a plurality of operatively interassociated modules, the modules collectively capable of performing a coordinated printing process, a method of controlling the plurality of modules. A unique connection code is assigned to each connection between a pair of modules where a physical interaction between modules in the coordinated printing process can occur. An identification code is derived for a module by combining connection codes for a plurality of connections associated with the module. The module is caused to send a derived identification code thereof to a controller. The module is operated by the controller addressing the module by the identification code.

According to another aspect of the present invention, there is provided a method of controlling a plurality of operatively interassociated modules, the modules collectively capable of performing a coordinated process. A unique connection code is assigned to each connection between a pair of modules where a physical interaction between modules in the coordinated process can occur. An identification code is derived for a module by combining connection codes for a plurality of connections associated with the module. The module is caused to send a derived identification code thereof to a controller. The module is operated by the controller addressing the module by the identification code.

According to another aspect of the present invention, there is provided a connector for establishing a relationship between a first addressable module and a second addressable module in a modular system. A first end, operatively associable with the first addressable module, conveys a predetermined connection code to the first addressable module. A second end, physically attached to the first end, and operatively associable with the second addressable module, conveys the predetermined connection code to the second addressable module.

Figure 1:
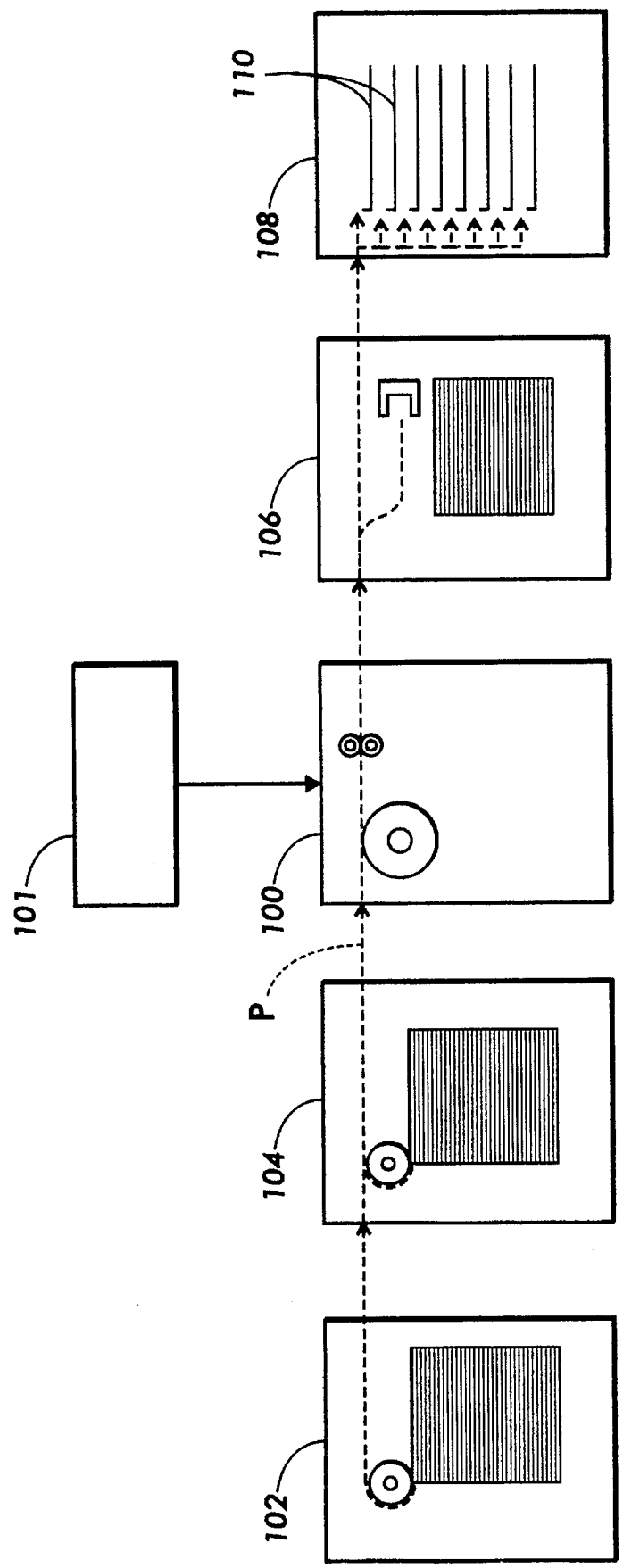
FIG. 1 is a simplified elevational view showing a high-volume printing system with modular architecture.

FIG. 1 is a simplified elevational view of a configuration of modules as would be found in a high-speed, high-volume electrophotographic printer, configured for a typical purpose. The central module in the system is the marking engine module, here indicated as 100. This marking engine module 100 accepts sheets along paper path P from an external source, and then places marks on the sheet in accordance with electronic or other information supplied from an image source, here indicated as 101. Image source 101 may be either an electronically-controlled system for creating images such as a host computer, a hard-copy digital scanner, or alternately could be part of a light-lens system for direct exposure of the photoreceptor in marking engine module 100. The specific image generated by image source 101 for printing by marking engine module 100 at any particular time will, of course, be dependent on the instantaneous availability of a particular desired sheet fed into marking engine 100 along paper path P.

As shown in FIG. 1, the particular illustrated configuration includes two paper feeder modules, respectively indicated as 102 and 104. It is typically desirable to have multiple paper feeder modules in a system, either so that one of two sizes of sheets are readily available at any time, or else to have a module dedicated to feeding a particular type of sheet, such as a letterhead sheet, cover stock, tab stock, or transparencies. It is a common application of high-volume printing systems that different feeder modules such as 102 or 104 are called upon within a single print job, such as to interleave tab stock with regular pages, or to supply heavy-bond covers at the front and back of a stack of regular sheets, to form a booklet. It will be noted, in the configuration of FIG. 1, that the printer modules 102, 104 are provided in series along a single paper path P so that, for example, a sheet fed from module 102 will have to pass through module 104 along paper path P in order to reach marking engine module 100.

On the other side of marking engine 100 can be provided any number of different types of "finishing" modules, which are used to assemble loose printed sheets of various types into finished products, such as booklets. Two example finishing modules are shown in FIG. 1. Module 106 is a stapler module which collects sheets fed into it, staples them as required, and then stacks the stapled booklets. Module 108 is a sorter or mailbox module which, in accordance with job ticket instructions associated with a particular print job, can direct a printed sheet from marking engine 100 to one of a plurality of mailboxes, such as 110, therein. In a typical office situation, it may be desirable that each person submitting a job to the printing system on a network have his particular job sent to a specific mailbox so that the job can be identified after printing. Of course, any number of other types of finishing modules, such as further mailbox modules, heat binders, envelope stuffers, slitters or perforators, etc. can be imagined. It will be noted that the series relationship of finishing modules is the same as with the feeder modules 102, 104: when, for example, stapler module 106 is not required, a sheet moving along paper path P simply passes through stapler module 106 untouched and into the desired further module such as 108.

The series relationship of the different feeder and finishing modules in a system requires that a control system recognize the precise relationship among modules in the system, even in situations where a particular module is not being used. For example, if, to print a particular desired print, a sheet must be fed from a stack in feeder module 102 and then after printing sent to a particular mailbox 110 in sorter module 108, the control system must take into account the fact that the sheet must take time to pass through module 104 before printing in module 100, and then pass through stapler module 106 before reaching sorter module 108. In some control system arrangements, unused modules such as 104 and 106 must be controlled to allow the pass-through of certain sheets. In brief, controlling of a modular system requires that the control system always have a basic "topography" of the entire physical system, even in situations where only a subset of the modules in the system are actually being used.

The control system of the present invention provides a method by which a control system can readily establish a physical topography of a particular configuration of a modular printing system. Individual modules in a system are given identification codes, for use by the central control system, which are immediately dependent on the physical relationship of a particular module to neighboring modules. By this system, the environmental-dependent identification codes of each module can inherently convey to the central control system not only the identity of the module, but also the total topography of the system.

Figure 2:
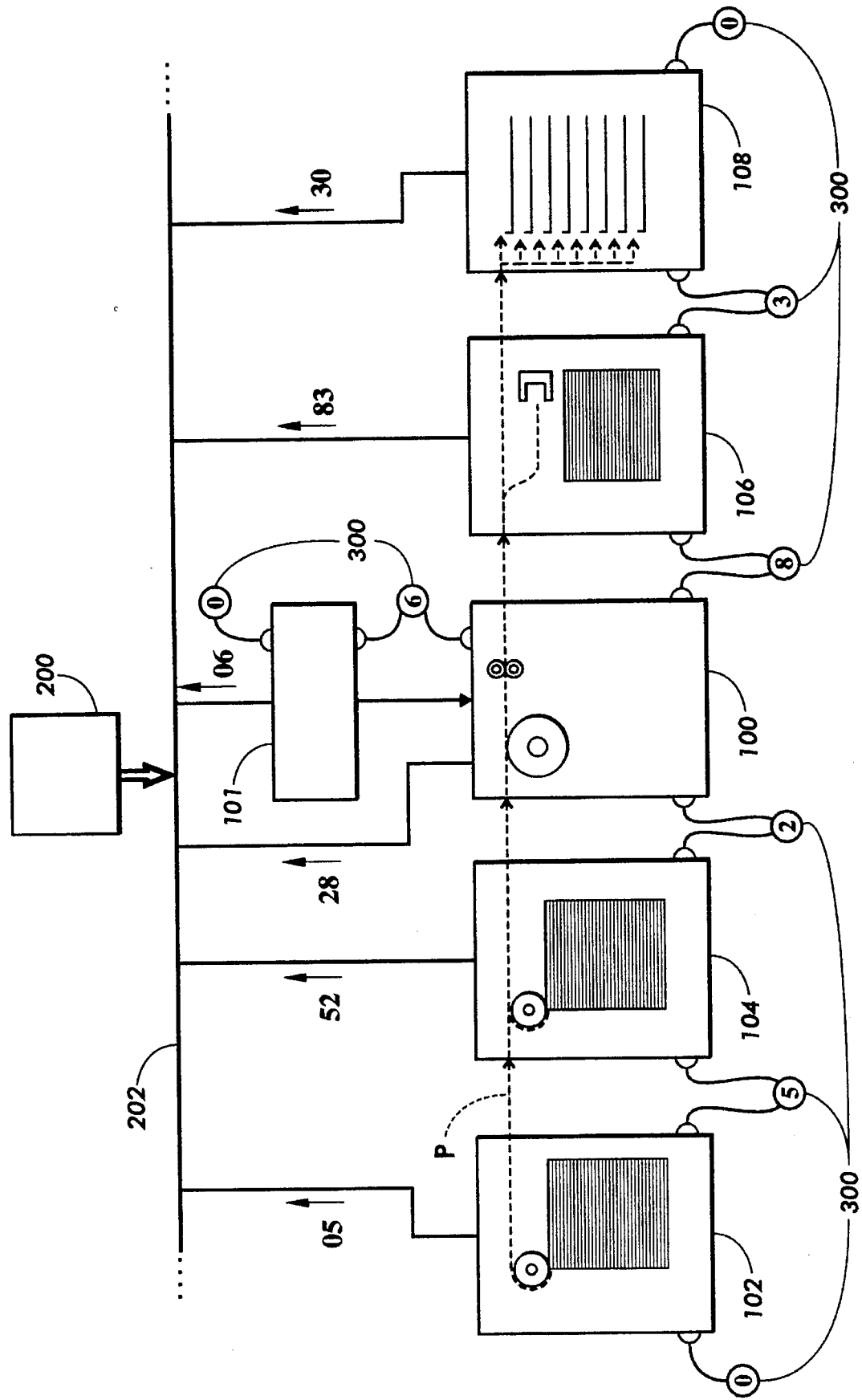
FIG. 2 is a systems diagram superimposed on the elevational view of FIG. 1, showing the operation of the method of the present invention and controlling the modules of the printing system.

FIG. 2 is a partially-elevational, partially-systems view of a control system of the present invention, as implemented on the basic modules shown in FIG. 1. The physical modules 100–108 of the printing apparatus are all connected to a central control module indicated as 200. As illustrated, the control system 200 interfaces to each individual module through a bus 202, but direct hard-wiring of the control module 200 to the other module is possible as well. The bus 202 can operate on an internal closed protocol, or alternately on an established protocol for network communication, such as Ethernet. In any event, the control module 200 controls the various physical modules 100–108 by conveyance of control signals to specific addressed modules at specific times, in order to perform a coordinated process with all or a subset of the available modules. For example, if it is desired to draw a sheet from feeder 102, create an image from image source 101 on the sheet at marking engine module 100, and then feed the printed sheet to a mailbox in sorter 108, not only will the directly-activated modules receive signals to carry out this process, but other intervening modules, such as 104 and 106, which are not directly involved in the desired process, must either be signaled to allow a pass-through of the sheet, or at the very least must be taken into account as consuming a quantity of pass-through time, so that a sheet leaving module 102 will be expected at marking engine 100 at a time which takes into account the fact the sheet must pass through module 104. In order to perform this type of coordinated process over many modules, it is necessary that the control module 200 be able to quickly address individual modules "by name," that is, by a unique identification code for each module.

According to the present invention, there is provided, between each neighboring pair of modules where a possible interaction between modules in a coordinated process can occur (such as, in the printing context, along the paper path P or at the interface between the image source 101 and marking engine 100), a connector which has a unique connection code associated therewith. This connector can be purely virtual, that is, existent only within a memory of the controller, or alternately may be manifest in a physical connector, as will be described in detail below. The essential attribute of this connector, whether physical or otherwise, is that there is a unique connection code specifically associated with the connector, and not directly associated with any particular module. Such connectors are illustrated in FIG. 2 as 300, and appear wherever a possible physical interaction between modules in the illustrated printing system can occur. It will be seen that each connector 300 is physically connected to two neighboring modules along the process direction P or between the image source 101 and marking engine 100, and further that each individual connector 300 has associated therewith a unique identification code in the form of a number which is shown in the circled portion of the illustrated connectors. As illustrated, the specific numbers associated with each connector can be arbitrarily selected: all that matters is that each connector have a unique identification code. According to the illustrated embodiment, where a module is at the end of a process and is connected to nothing, such as feeder module 102 or sorter 108, the "cap" connection is assigned the number 0.

According to the method of the present invention, these unique identification codes for each physical connection between modules are used to derive an identification code for each individual module. Significantly, the identification code for a module represents a combination of the connection codes for the connectors associated with the particular module. In the preferred embodiment, this combination of two connection codes for connectors is a concatenation of the two connection codes, forming an identification code for the module. For example, the connector codes for the connectors 300 attached to module 102 are 0 and 5: therefore, as shown by the connection of feeder module 102 to bus 202, the derived identification code for purposes of control module 200 is a concatenation of connector codes 0 and 5, or 05. Similarly, for feeder 104, the module 104 is disposed between connectors which have been arbitrarily assigned connection codes 5 and 2: therefore, by concatenating these connection codes, an identification code of 52 is used by the control module 200 for module 104. Marker engine module 100, being between connectors 2 and 8, is identified as 28; stapler module 106, disposed between connectors 8 and 3 is assigned the identification code 83; and sorter module 108, disposed at the end of the process, is between a connector 3 and a "cap" 0, and is therefore assigned the code 30. Further, image source 101 is connected to marker engine module 100 by a connector 6 and is therefore assigned the identification code 06.

Under this system, each individual module makes itself known to control module 200 by an identification code which is not only unique relative to all other modules in the system, but also inherently identifies the location of the particular module within the physical process being performed by the modules. At start-up or upon a reconfiguration of the system, each individual module 102 can send to control module 200 its unique identification code as well as another type of code which indicates exactly what type of device (feeder, marking engine, etc.) it is. From this relatively small amount of information, the control module 200 can easily derive the topography of the physical system, that is, determine the exact physical relationship of all the identified modules. During operation of the entire system, such as when prints are actually being made, individual instructions from control module 200 to individual modules as needed can be sent to the correct module by addressing particular modules by their particular code. For example, if at a given point in a printing process control module 200 must send a certain signal over bus 202 to feeder module 104, the feeder module 104 will be addressed as "52": upon seeing the "52" address signal on bus 202, feeder module 104 will recognize a related signal on bus 202 as intended for it. Similarly, a signal from control module 200 intended for stapler module 106 will be prefaced or otherwise associated with the identification signal "83", and so forth.

An advantage to the method of the present invention is that, because each individual module has a name which is not only unique but indicates its position in the system, a control module such as 200 can take into account the presence of modules which are not used at a particular time. For example, if the control module 200 knows that a sheet leaving marking engine 100 intended for a particular mailbox in sorter 108 at time t, the system can "realize," by virtue of the various identification codes of the modules, that the sheet must pass through module 106 before it is accepted by sorter 108. Because control module 200 has information that the sheet must pass from the marking-engine module known to it as 28, and must appear sometime later in sorter 30, the system will realize that the page must pass through, at the very least, another module with the code 83, in order to make the connection between module 28 and module 30. To take another example, if the control module 200 must draw a sheet from a stack in feeder 102 (identified by control module 200 as 05), ultimately destined for stapler module 106 (known to control module 200 as 83), the control module 200 can determine that the sheet must pass through module 52 and then module 28 (respectively, feeder module 104 and marking engine module 100) before reaching stapler module 106 which is identified as 83. In this way, control module 200 can take into account modules physically arranged on the system, even if they are not used at a particular time.

As mentioned above, the connectors 300 may conceivably be in a virtual form, with the identifying connection code for each connection 300 simply being fed into a memory within control module 200. Alternately, the connection codes representing different connections between modules can be manifest in physical connectors. Looking at the connectors 300 in FIG. 2, it is apparent that the effective attributes of any physical connector 300 are simply that each individual connector 300 must have at least two ends, each of which can be operatively connected to one of the pair of modules in the connection and that the connection must have permanently associated therewith a unique connection code, such as hereshown in the form of an integer such as 5. Once again, connectors 300 marking the end of a process are typically assigned a standard code of 0.

Figure 3:
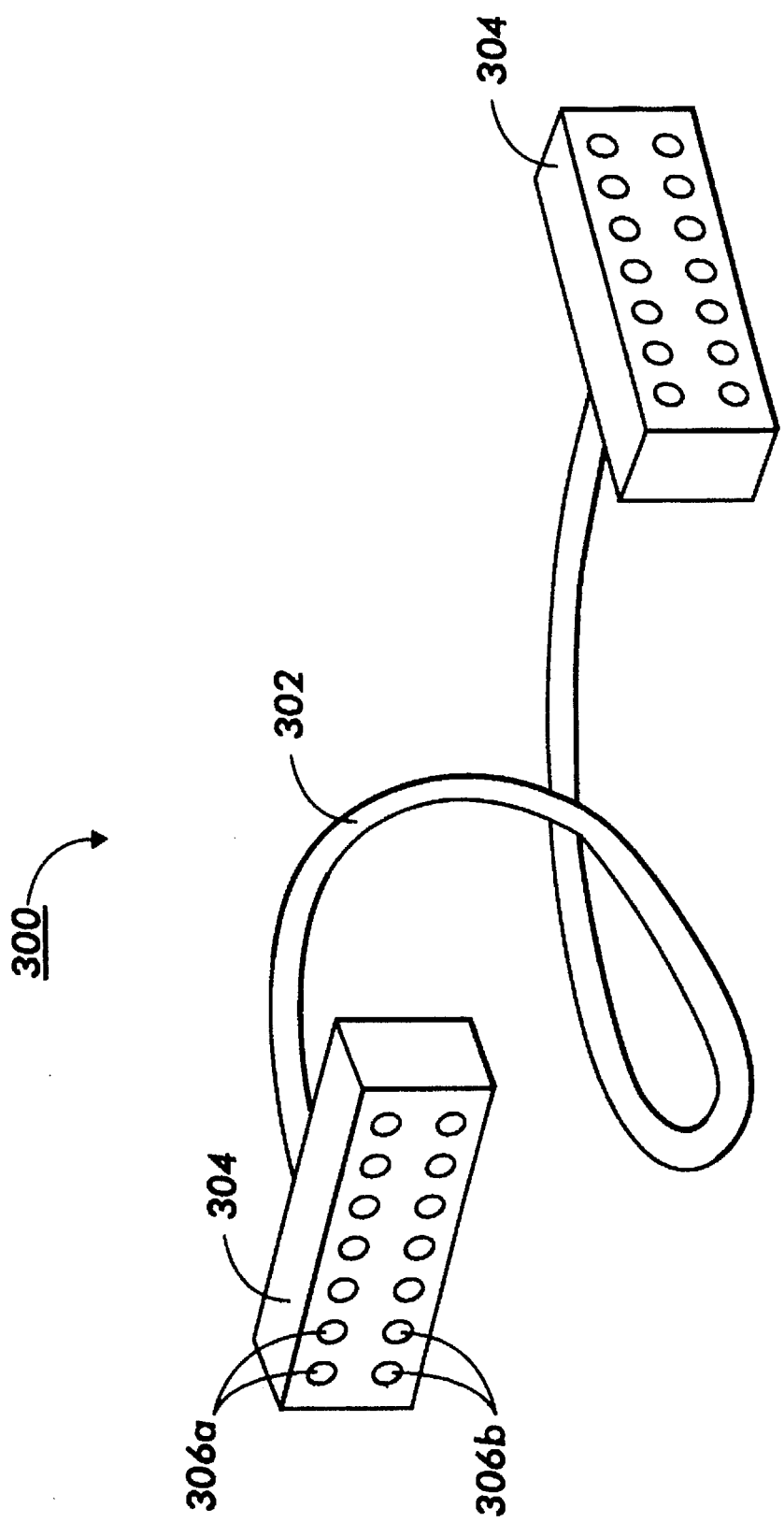
FIG. 3 shows a representative physical connector according to the present invention, in isolation.

FIG. 3 is a perspective view of an individual connector 300 of a proposed design according to the present invention, shown in isolation. Connector 300 comprises a cord 302, with identical plugs 304 at either end thereof. The word "plug" is here used very generally and may encompass structures which accept extended members, or which have extended members themselves. What is important about each plug 304 is that, when operatively associated with complementary structures (not shown) within a particular module, the plug 304 must convey the unique connection code associated with that particular connector 300. As for the FIG. 3 embodiment, it will be seen that there are provided in each plug 304 two rows of sockets 306a and 306b. These rows of sockets can accept extended members within each module, and corresponding pairs of sockets between rows 306a and 306b may or may not be connected. That is, a certain unique subset of pairs of sockets within each plug 304 will cause a connection therebetween. The identity of which pairs of sockets in rows 306a or 306b are connected to each other can be used to convey a binary or other digital number which is the connection code. For example, if the connection code associated with a particular connector 300 is 5, the binary number for 5 is 101. Therefore, starting at one end of the two rows of sockets in plug 304, there will be connections between pairs of sockets in such a manner to convey this binary number 101.

According to the present invention, both plugs 304 at either end of a connector 300 must convey, by the identity of connections therein, the same binary number. In this way, as shown in FIG. 2, each connector 300 will convey the unique connection code for the connection to a corresponding connection code interface (such as another socket, not shown) within each module.

It will be apparent that many variations to the illustrated plugs 304 in FIG. 3 are possible. For example, each plug 304 could be provided with plastic fingers which, when applied to a battery of microswitches, push the desired combination of microswitches to form a desired binary number in the module. Plugs 304 need not contain sockets, but also could conceivably simply include conductive traces on a flat surface to convey the connection code. Alternately, each plug 304 could include a magnetic stripe or optical code thereon to convey a particular connection code.

Significantly, it is not necessary that there be any electrical connection whatsoever between plugs 304 within an individual connector 300. That is, cord 302 need not be a conductive wire. The advantage of not having any electrical connection between modules (except through the control module 200) is that modules made by different manufacturers need not be compatible in terms of reference voltages. However, it may be desirable to include the elements of a physical connector according to the present invention as part of some sort of conductive inter-module bus which does transmit electrical signals directly between modules. However, any electrical connection along the physical connector is not necessary according to the present invention. For purposes of the present invention, all that matters is that the connector 300 convey the unique connection code associated therewith to the modules to which it is connected.

Figure 4:
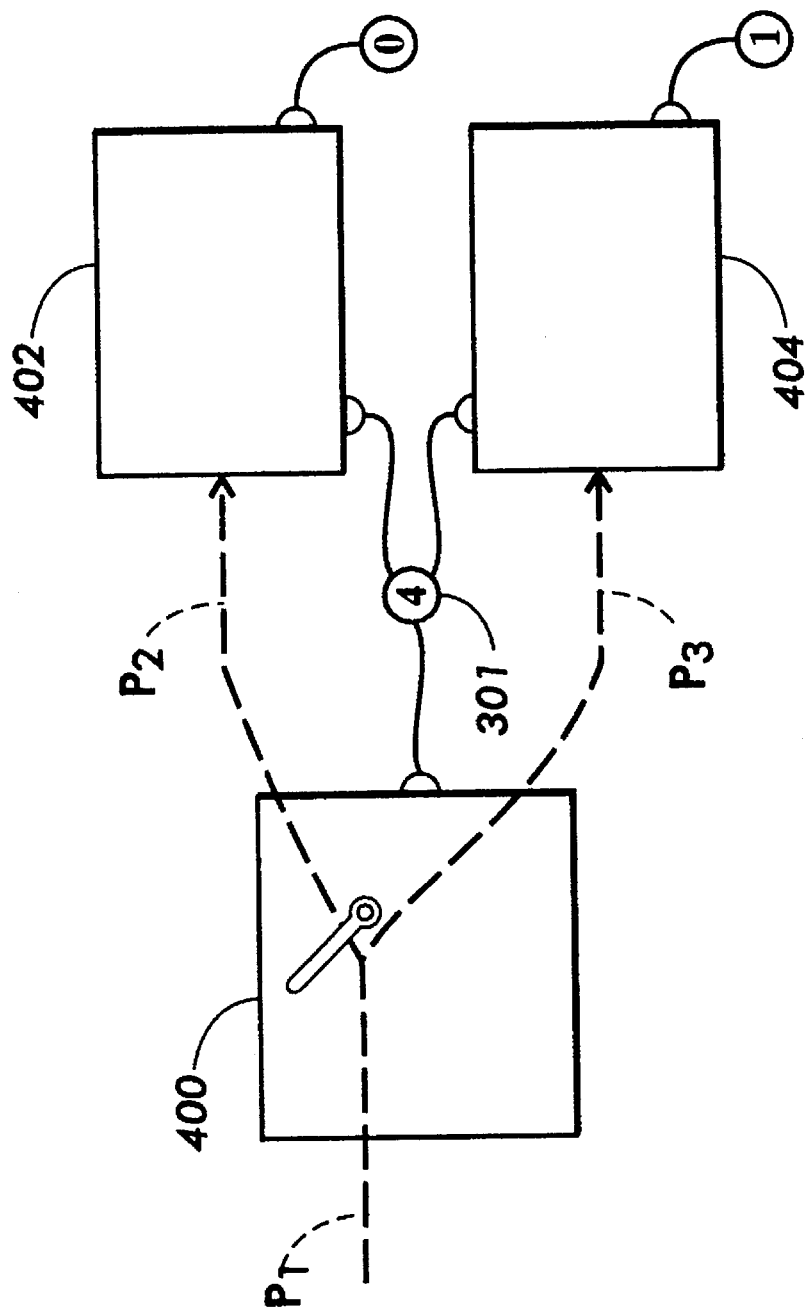
FIG. 4 is a systems diagram showing a variation of a physical connector according to the present invention, in combination with modules arranged in a parallel fashion.

Although the FIG. 2 embodiment shows a substantially "linear" arrangement of modules in a system, it is conceivable that the method of the present invention can be applied to more sophisticated systems as well. FIG. 4 shows an example configuration of modules wherein, for example, a sheet traveling along paper path $P_1$ can enter a module 400 and be routed selectively either through a paper path $P_2$ to a module 402 or through a parallel path $P_3$ to another module 404. In such a case, a three-ended connector, here indicated as 301 and conveying the connection code 4, has three separate ends, each conveying the unique connection code associated with connector 301 to the module. Of course, the control module controlling this set of modules would have to take this arrangement into account in controlling the system. It may be necessary to adapt the entire system to be able to distinguish between parallel modules such as 402 and 404. In the FIG. 4 embodiment, the "cap" connectors for each parallel module 402, 404 are different: module 402 is capped with a 0 connector, while module 404 is capped with a 1 connector. Under this system, a control module would identify module 402 as 40, and module 404 as 41. Different adaptations based on the general claimed method will be apparent.

Although, in the illustrated embodiment, there is shown a large-scale printing apparatus in which relatively large modules are connected along a paper path, the method of the claimed invention can be used for the operation of individual boards within a smaller, stand-alone printer or copier. For example, it is known to design a printing or copying apparatus with a plurality of boards, each being identical in the hardware sense but being loaded with different software depending on the specific function within the printer. The method of the present invention can be used for controlling a plurality of such boards within a relatively small-scale, stand-alone apparatus.

Although the embodiment of the present invention is specifically directed to printing systems, it is apparent that the general claimed method could be applied to the design of any mass-production system wherein different function-specific modules are arranged in a physical path for carrying out a coordinated process. Such mass-production systems could include any assembly-line manufacturing process, or a process by which physical samples of some sort (blood samples, fruits, manufactured objects, etc.) are subjected to a series of individual tests.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. In a printing system wherein sheets are caused to move among a plurality of operatively interassociated modules, the modules collectively capable of performing a coordinated printing process, a method of controlling the plurality of modules, comprising the steps of:

assigning a unique connection code to each connection between a pair of modules where a physical interaction between modules in the coordinated printing process can occur;

deriving an identification code for a module by combining connection codes for a plurality of connections associated with the module;

causing the module to send a derived identification code thereof to a controller; and operating the module by the controller addressing the module by the identification code.

2. The method of claim 1, the assigning step including the steps of providing in each module a connection code interface;

providing a physical connector, having a first end and a second end, each end adapted to convey the unique connection code for a connection to a connection code interface in a module; and operatively connecting each end of the physical connector to a connection code interface in a module.

3. The method of claim 1, wherein the first end and second end of the physical connector are not electrically connected.

4. The method of claim 1, the deriving step including the steps of rendering each connection code as a digital number; and concatenating the digital numbers of a plurality of connection codes to yield an identification code in a form of a digital number.

5. A method of controlling a plurality of operatively interassociated modules, the modules collectively capable of performing a coordinated process, comprising the steps of:

assigning a unique connection code to each connection between a pair of modules where a physical interaction between modules in the coordinated process can occur;

deriving an identification code for a module by combining connection codes for a plurality of connections associated with the module;

causing the module to send a derived identification code thereof to a controller; and operating the module by the controller addressing the module by the identification code.

6. The method of claim 5, the assigning step including the steps of providing in each module a connection code interface;

providing a physical connector, having a first end and a second end, each end adapted to convey the unique connection code for a connection to a connection code interface in a module; and operatively connecting each end of the physical connector to a connection code interface in a module.

7. The method of claim 5, wherein the first end and second end of the physical connector are not electrically connected.

8. The method of claim 5, the deriving step including the steps of rendering each connection code as a digital number; and concatenating the digital numbers of a plurality of connection codes to yield an identification code in a form of a digital number.

* * * * *